United States Patent [19]

McDaniel et al.

[11] Patent Number: 4,619,980

[45] Date of Patent: Oct. 28, 1986

[54] POLYMERIZATION CATALYST, METHOD OF MAKING AND USE THEREFOR

[75] Inventors: Max P. McDaniel, Bartlesville, Okla.; Paul D. Smith, Houston, Tex.

[73] Assignee: Phillips Petroleum Company, Bartlesville, Okla.

[21] Appl. No.: 718,668

[22] Filed: Apr. 1, 1985

[51] Int. Cl.$^4$ ............................. C08F 4/62; C08F 4/68
[52] U.S. Cl. ...................................... 526/96; 526/120; 526/123; 526/130; 526/352; 502/113; 502/117; 502/154; 502/155
[58] Field of Search .................. 526/96, 120, 123, 130, 526/146

[56] References Cited

U.S. PATENT DOCUMENTS

| | | | |
|---|---|---|---|
| 3,157,712 | 11/1964 | Walker et al. | 526/130 |
| 3,378,536 | 4/1968 | Walker et al. | 526/96 |
| 3,497,488 | 2/1970 | Dawans et al. | 526/120 X |
| 3,715,321 | 2/1973 | Horvath | 526/96 X |
| 3,757,002 | 9/1973 | Karol | 526/129 X |
| 3,806,500 | 4/1974 | Karol | 526/129 X |
| 3,976,632 | 8/1976 | Delap | 526/96 |
| 3,984,351 | 10/1976 | Rekers et al. | 526/129 X |
| 4,303,770 | 12/1981 | Pullukat et al. | 526/96 |
| 4,312,967 | 1/1982 | Norwood et al. | 526/64 |
| 4,325,839 | 4/1982 | McDaniel | 526/96 X |
| 4,331,559 | 5/1982 | Banasiak | 502/154 |
| 4,364,841 | 12/1982 | McDaniel et al. | 526/129 X |
| 4,368,303 | 1/1983 | McDaniel | 526/106 |
| 4,369,295 | 1/1983 | McDaniel | 526/96 |
| 4,444,968 | 4/1984 | McDaniel et al. | 526/129 |

Primary Examiner—Patrick P. Garvin
Attorney, Agent, or Firm—Stephen E. Reiter

[57] ABSTRACT

Polymerization catalyst consisting essentially of treated silica support and zerovalent chromium compound is provided, as well as process for preparation and polymerization process with the invention catalyst. Silica treatment involves contacting a predominantly silica-containing support with at least one compound selected from the group consisting of Group IIA oxide or compounds convertible to the oxide form, a Group VA or VB oxide or compounds convertible to the oxide form or sulfuric acid, and calcining prior to contacting the treated support with a zerovalent chromium compound, thereby producing an active polymerization catalyst.

9 Claims, No Drawings

POLYMERIZATION CATALYST, METHOD OF MAKING AND USE THEREFOR

This invention relates to zerovalent chromium polymerization catalysts associated with promoted silica supports. In one aspect, the invention relates to methods for preparing polymerization catalysts. In another aspect, the invention relates to polymerization catalysts per se. In yet another aspect, the invention relates to a process for the polymerization or co-polymerization of ethylene.

Supported chromium-containing catalysts are known to be useful for the preparation of olefin polymers. Commonly employed catalysts consist of chromium oxide on a support. When employing catalysts in the oxide form, an induction period is commonly observed before an active polymerization reaction ensues. Presumably the induction period is caused by the need to reduce the chromium compound to a lower oxidation state.

There would be certain advantages to utilizing zerovalent chromium compounds in polymerization catalyst systems, such as for example, reduction or elimination of the induction period observed with oxidized chromium compounds. In addition, zerovalent chromium based catalysts produce ethylene polymers with a broad molecular weight distribution, which distribution is beneficial for certain end uses, such as blow molding. Furthermore, due to the high solubility of many zero valent chromium compounds, zerovalent chromium-based catalyst compositions are easy to handle, e.g. they can be charged to the reactor directly versus more complicated catalyst preparation and handling required by other chromium-based catalyst systems. While it has long been known to utilize zerovalent chromium compounds on silica supports, such use has never achieved commercial success because of the very low polymerization activity associated with such catalysts.

OBJECTS OF THE INVENTION

It is, therefore, an object of the present invention to provide active silica supported zerovalent chromium polymerization catalysts.

Another object of the invention is a process for the polymerization of ethylene with silica supported zerovalent chromium compounds.

These and other objects and advantages of the invention will be apparent from the detailed description of the invention and the appended claims.

STATEMENT OF THE INVENTION

In accordance with the present invention, we have discovered that zerovalent chromium compounds can be rendered active for olefin polymerization by combining a zerovalent chromium compound with a silica support which has been previously treated with at least one compound selected from the group consisting of Group IIA oxide or compounds convertible to the oxide form, a Group VA or VB oxide or compounds convertible to the oxide form or sulfuric acid, and calcined prior to contact with the zerovalent chromium compound. The resulting catalysts provide good polymer productivities and are responsive to the presence of hydrogen, i.e., melt index of the polymer product can be varied by controlling the presence or absence of hydrogen in the polymerization reaction.

DETAILED DESCRIPTION OF THE INVENTION

In accordance with the present invention, there is provided a novel polymerization, catalyst consisting essentially of a treated silica-containing support and a zerovalent chromium compound. The silica-containing support is treated with an effective amount of at least one compound selected from the group consisting of Group IIA oxide or compounds convertible to the oxide form, a Group VA or VB oxide or compounds convertible to the oxide form or sulfuric acid, and then calcined prior to contacting with the zerovalent chromium compound.

In accordance with another embodiment of the present invention, there is provided a method for the preparation of the above-described polymerization catalyst.

In accordance with yet another embodiment of the present invention, there is provided a (co)polymerization, i.e., polymerization or copolymerization, process employing the above-described polymerization catalyst.

The silica supports employed to prepare the polymerization catalyst of the present invention usually contain a major proportion of silica. Preferred silica supports contain a substantial proportion of silica, e.g. at least about 80% by weight of silica, preferably at least about 90% by weight of silica, although still larger proportions of silica can be used. The preferred predominantly silica-containing supports of the present invention consist essentially of less than or equal to about 20% by weight of additional metal oxides such as for example, alumina, boria, magnesia, titania, zirconia, and the like, and mixtures of any two or more thereof. Generally, the silica support employed has a surface area of at least about ten square meters per gram ($m^2/g$). Preferably, the surface area of the silica support will be at least 50 $m^2/g$, and most preferably support employed will be a high surface area silica, i.e. support with a surface area in excess of about 100 $m^2/g$. Another important consideration with respect to silica support is the size of the support particles.

In accordance with the present invention, the predominantly silica-containing support is contacted with at least one compound selected from the group consisting of Group IIA oxide or compounds convertible to the oxide form, a Group VA or VB oxide or compounds convertible to the oxide form or sulfuric acid, then calcined.

Group IIA compounds contemplated to be useful in the practice of the invention are oxides of beryllium, magnesium, calcium, strontium and barium, as well as compounds of such Group IIA elements which are convertible to the oxide form. Preferred are oxides or compounds convertible to the oxide form of calcium and magnesium. Examples of compounds within this group are magnesium nitrate, magnesium sulfate, magnesium acetate, magnesium carbonate, magnesium formate, magnesium hydroxide, calcium nitrate, calcium sulfate, calcium acetate and the like and mixtures of any two or more thereof.

Group VA compounds contemplated to be useful in the practice of the invention are oxides of arsenic, antimony and bismuth, as well as compounds of such Group VA elements which are convertible to the oxide form. Preferred are oxides or compounds convertible to the oxide form of antimony and bismuth. Examples of compounds wihin this group are antimony nitrate, antimony oxide, bismuth acetate, bismuth nitrate, bismuth hydroxide, bismuth sulfate, bismuth oxalate, and the like and mixtures of any two or more thereof.

Group VB compounds contemplated to be useful in the practice of the invention are oxides of vanadium, niobium and tantalum, as well as compounds of such Group VB elements which are convertible to the oxide form. Preferred are oxides of vanadium or vanadium compounds convertible to the oxide form. Examples of compounds within this group are vanadium sulfate, vanadyl sulfate, vanadium oxide, vanadium chloride, and the like and mixtures of two or more thereof.

Those of skill in the art recognize that the amount of promoting compound to use for treating the silica-containing support can vary widely, depending on the exact composition of the silica-support used, the zerovalent chromium compound to be employed, and the like. Generally, amounts in the range of about 0.01–20 mole %, calculated as the metal and based on the untreated support are suitable.

The conditions of silica support-promoting compound contact are not critical. Any temperature and any period of contact time is suitable. For convenience, contacting is generally carried out at about room temperature, although higher or lower temperatures can be employed. A time period sufficient to allow the support and reagents to come into intimate contact is all that is necessary. Thus, the silica support and a solution containing the promoting compound may be brought into contact for as little time as a few seconds to several hours or more, as convenient. Following contact of the silica support and solution containing the promoting compound, any excess liquid can be removed by suitable means, such as, for example, decantation, filtration or the like. The treated support can then be dried to remove absorbed solvent. Any suitable means, as well known by those skilled in the art, may be employed, such as, for example, oven drying, passing a vigorous stream of dry (moisture-free) gas over the treated support and the like.

The treated silica support is then subjected to calcination conditions. Calcination is conducted by heating the treated silica in the presence of a dry oxygen-containing gas, such as, for example, air, at a temperature in the range of about 300°–800° C. for a time in the range of about 0.5–20 hours. Typically less time is required at higher calcination temperatures and vice versa.

Treated silica-containing support, after calcination, can then be contacted with a zerovalent chrominum compound in the substantial absence of oxygen or moisture prior to introducing the catalyst composition into a polymerization reactor; or the treated, calcined silica-containing support can be introduced into a substantially dry, oxygen free polymerization reactor separately from the zerovalent chromium compound. Generally, an amount of about 0.1–10% by weight of at least one zerovalent chromium compound, calculated as chromium metal and based on the weight of the treated silica-containing support will be employed.

Suitable zerovalent chromium compounds are represented by the following formulae:

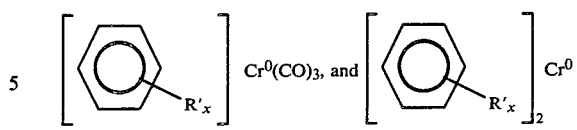

wherein each R' is independently a $C_1$–$C_6$ alkyl radical and x is a whole number ranging from 1–6 inclusive. Preferred zerovalent organochromium compounds are the diarenechromium compounds such as for example, dibenzene chromium, ditoluene chromium, di-o-xylene chromium, di-p-xylene chromium, dicumene chromium, dimesitylene chromium, di(n-propylbenzene)chromium, di(1,3,5-triethylbenzene)chromium, di(1,3-diethyl-4-hexylbenzene)chromium, di(1,3-dipentylbenzene)chromium, di-(1,3,5-trihexylbenzene)chromium, di(hexamethylbenzene)chromium, and the like, and mixtures of any two or more thereof.

The zerovalent chromium compounds useful in the practice of the present invention are liquids or solids soluble in many organic solvents. Preferred solvents are non-polar liquids at ambient temperatures which are sufficiently volatile to allow removal by evaporation. Types of suitable solvents include alkanes, cycloalkanes, aromatic hydrocarbons, halogenated compounds, ethers, and the like. Exemplary solvents include pentane, n-hexane, decane, cyclohexane, methylcyclohexane, benzene, xylenes, chloroform, diethylether, and the like, and mixtures of any two or more thereof. While the liquid zerovalent chromium compounds can be introduced onto the support neat, it is preferred for easy and efficiency in handling of the organochromium compounds that solvent be used in all cases.

The contact of the zerovalent chromium compound with the treated predominantly silica-containing support is preferably carried out in a dry, inert atmosphere, such as nitrogen or under a vacuum, and the resulting catalyst is preferably maintained in a dry inert atmosphere or under vacuum until it is used.

Alternatively, the zerovalent chromium compound and the treated predominantly silica-containing support can be added separately to the substantially dry, oxygen free polymerization reactor.

Optionally, a trihydrocarbylborane co-catalyst having the formula $BR_3$, wherein R is a hydrocarbyl or substituted carbon radical having 1–10 carbon atoms, can be employed in the polymerization reaction. Preferably, $BR_3$ will be a trialkylborane, the alkyl groups preferably having about 2 to 5 carbon atoms per group.

The catalysts prepared in accordance with the present invention are useful for the (co)polymerization, i.e., polymerization or co-polymerization, of mono-1-olefins having 2–10 carbon atoms. The invention catalysts are especially preferred for the polymerization of ethylene, optionally in the presence of up to about 10 mol % of a mono-1-olefin having 3–10 carbon atoms. Examples of suitable comonomers include propylene, 1-butene, 1-pentene, 1-hexene, 3-methyl-1-butene, 4-methyl-1-pentene, and the like. The polymerization process of the present invention is generally carried out in the range of about 20°–200° C., preferably about 50°–110° C. and at a pressure in the range of 0 to 1500 psia, preferably ranging from 0 to 1000 psia.

In the polymerization reaction, a reaction solvent may be employed, such as for example, an aliphatic, alicyclic or aromatic hydrocarbon or mixtures thereof. Examples of suitable solvents include propane, n- or iso-butane, n- or iso-pentane, n- or iso-hexane, n- or iso-heptane, cyclohexane, benzene, toluene, and the like. Alternatively, the polymerization reaction may be conducted in the gas phase wherein gaseous ethylene is directly contacted with the catalyst without the use of solvent. A particularly preferred method for carrying out the polymerization process of the present invention is under particle form polymerization conditions, i.e. under conditions such that the polymer product is insoluble in the solvent employed, thereby facilitating recovery of the polymer product and recycle of the reaction solvent.

A further understanding of the present invention and it advantages will be provided by reference to the following non-limiting examples.

EXAMPLE I

A series of silica samples was prepared by shaking individual 20 g portions of a particulate catalytic grade silica (Davison 952 grade microspheroidal silica) with 20 cms of deionized water and the specified quantity of the modifiers $Ca(NO_3)_2 \cdot 4H_2O$ or $Mg(NO_3)_2 \cdot 6H_2O$. The water was removed from each mixture in a vacuum oven and the dried product was subsequently calcined under fluidizing conditions with dry air (42 L/hr at STP) in a quartz tube for 3 hours at the specified temperature. The recovered products were stored at room temperature in stoppered flasks under dry air until ready for testing.

Ethylene polymerization was conducted with a specified quantity of each modified silica and a specified quantity of dicumene chromium dissolved in n-heptane and adjuvant, if used. Polymerization was accomplished in a 2 liter stirred stainless steel reactor containing about 567 g (1.25 lbs) of isobutane diluent at about 96° C. (205° F.) and at a total pressure of about 3.89 MPa (565 psia). Each component was charged separately to the reactor. Generally, silica was charged first to the reactor containing the diluent, the chromium compound was added next followed by triethylborane (TEB) adjuvant, if used, and ethylene. The reactor was heated to the desired temperature, hydrogen adjuvant, if used, was added and the run was started. The pressure was maintained during a run by admitting ethylene as required from a pressurized reservoir. A run was terminated by discontinuing heating and venting gaseous components.

Abbreviations and test procedures are as follows:

g/g silica: Productivity in terms of g polymer per g silica used.

MI: Melt index, g/10 min, ASTM D 1238-65T (condition E).

HLMI: High load melt index, g/10 min, ASTM D 1238-65T. (condition F)

Density: $g/cm^3$, ASTM D 1505-68.

Flexural Modulus: MPa, ASTM D 790-66.

$M_w(M_n)$: Weight average (number average) molecular weight as determined by means of gel permeation chromatography TEB. Triethylborane, in terms of ppm based on diluent Vinyl/Methyl: Number of vinyl groups and methyl groups per 1,000 carbon atoms of the polymer as determined by infrared analyses.

The components used and the results obtained in polymerization are given in Table IA. Polymer properties are in Table IB.

TABLE IA

Ethylene Polymerization, Ca(Mg)-Modified Silica

| (a) Run No. | Silica Component | | | | (c) Chromium added mg | Adjuvant (Concen.) | Run Time min. | Polymer Yield g | Product g/g |
|---|---|---|---|---|---|---|---|---|---|
| | Modifier | (b) Mole Ratio SiO2: Modifier | Calcining Temp. °C. | Weight g | | | | | |
| 1 | Ca(NO3)2 | 13.2 | 500 | 0.4100 | 2.5 | None | 50 | 126 | 307 |
| 2 | Ca(NO3)2 | 13.2 | 500 | 0.3700 | 2.5 | H2 (0.34 MPa) | 80 | 80 | 216 |
| 3 | Ca(NO3)2 | 13.2 | 500 | 0.5230 | 5 | H2 (0.34 MPa) TEB (8 ppm) | 60 | 83 | 159 |
| 4 | Ca(NO3)2 | 13.2 | 700 | 0.4939 | 2.5 | H2 (0.34 MPa) | 60 | 53 | 107 |
| 5 | Mg(NO3)2 | 13.2 | 500 | 0.3881 | 2.5 | None | 60 | 153 | 394 |
| 6 | Mg(NO3)2 | 6.6 | 500 | 0.5520 | 2.5 | None | 60 | 100 | 181 |
| 7 | (NH4)2SiF6 | 150 | 600 | 0.4173 | 2.5 | None | | Dead | |
| 8 | None | — | 700 | 0.0760 | 1.25 | None | | Dead | |
| 9 | H3BO3 | 103 | 500 | 0.0508 | 1.25 | None | | Dead | |

(a) Runs 1-6 are invention. Runs 7-9 are controls.
(b) Calculated
(c) Calculated weight chromium added as dicumene chromium.

TABLE IB

Polymer Properties

| Run | MI g/10 min. | HLMI | HLMI/MI | Density g/cm | Flexural Modulus MPa | Molecular Weight | | | Groups/1000 carbon atoms | |
|---|---|---|---|---|---|---|---|---|---|---|
| | | | | | | (d) Mw | (d) Mn | Mw/Mn | Vinyl | Methyl |
| 1 | 0 | 4.4 | — | 0.9512 | 911 | nd (e) | nd | nd | 2.2 | 5.5 |
| 2 | 0.16 | 36 | 228 | 0.9498 | 791 | 199 | 7.9 | 25 | 2.0 | 5 |
| 3 | 0.15 | 41 | 273 | 0.9460 | 720 | 231 | 6.6 | 35 | 2.5 | 6 |
| 3 | 0.04 | 16 | 407 | 0.9469 | 705 | nd | nd | nd | 1.9 | 5.0 |
| 4 | 0 | 1.3 | — | 0.9515 | nd | nd | nd | nd | 2.1 | 3.2 |
| 5 | 0 | 0.58 | — | 0.9560 | nd | nd | nd | nd | 1.9 | 3.0 |

(d) actual value divided by 1000
(e) nd means not determined

Control runs 7-9 show that silica alone or promoted with $(NH_4)_2SiF_6$ or $H_3BO_3$ in combination with an organochromium compound such as dicumene chromium, each component charged separately to the reactor, yield an inactive catalyst system for ethylene polymerization. However, if the silica is contacted with a minor amount of a calcium or magnesium compound to give a composition which is subsequently calcined in air and such a composition is employed with the chromium calcination the Bi would probably be present as $Bi_2O_3$. A portion of each sample was employed in ethylene polymerization in combination with dicumene chromium and adjuvant(s), if used, as described before.

The abbreviations shown and test procedures employed have the same meanings as before.

The components used and results obtained are presented in Table IIA. Polymer properties are given in Table IIB.

TABLE IIA

Ethylene Polymerization, Bismuth-Modified Silica

| (a) Run No. | Silica Component Modifier | Calculated Mole Ratio $SiO_2$: Modifier | Calcining Temp. °C. | Weight g | Chromium added mg | Adjuvant (Concen.) | Run Time min. | Polymer Yield g | Product g/g |
|---|---|---|---|---|---|---|---|---|---|
| 10 | $Bi(NO_3)_3$ | 5.7 | 500 | 0.4652 | 2.5 | None | 60 | 190 | 408 |
| 11 | $Bi(NO_3)_3$ | 5.7 | 500 | 0.4644 | 2.5 | $H_2$ (0.34 MPa) TEB (8 ppm) | 60 | 200 | 431 |
| 12 | $Bi(NO_3)_3$ | 5.7 | 700 | 0.3548 | 2.5 | None | 50 | 90 | 254 |
| 13 | $Bi(NO_3)_3$ | 5.7 | 700 | 0.3530 | 2.5 | $H_2$ (0.34 MPa) | 60 | 93 | 263 |
| 14 | $Bi(NO_3)_3$ | 17 | 500 | 0.0550 | 5 | None | 60 | 256 | 243 |
| 15 | $Bi(NO_3)_3$ | 17 | 500 | 0.7162 | 2.5 | $H_2$ (0.34 MPa) | 60 | 139 | 194 |
| 8 | None | — | 700 | 0.0760 | 1.25 | None | | Dead | |

(a) Runs 10-15 are invention. Control run 8 is repeated from Table IA.

TABLE IIB

| | | | | Polymer Properties | | | | |
|---|---|---|---|---|---|---|---|---|
| Run No. | MI g/10 min. | HLMI | HLMI / MI | Density g/c | Flexural Modulus MPa | (b) ESCR F50, hrs | Groups/1000 carbon atoms Vinyl | Methyl |
| 10 | 0 | 1.4 | — | 0.9470 | nd | nd | 2.0 | 4.7 |
| 11 | 0 | 3.8 | — | 0.9520 | nd | nd | 2.0 | 3.4 |
| 12 | 0 | 1.5 | — | 0.9443 | nd | nd | 2.3 | 6.0 |
| 13 | 0.04 | 16 | 400 | 0.9467 | 771 | >1000 | nd | nd |
| 14 | 0 | 1.5 | — | 0.9492 | 959 | nd | 2.2 | 4.3 |
| 15 | 0.019 | 7.7 | 405 | 0.9560 | 1111 | nd | 1.9 | 3.6 |

(b) Environmental stress cracking resistance determined in accordance with ADTM D 1693-70.

compound, an active ethylene polymerization catalyst system is generated. After calcination, the Ca and Mg would presumably be present as CaO and MgO, respectively. Based on the silica component alone, the calculated productivity appears to be low as the values range from about 100 to 400 g polymer per g silica. If, however, calculated productivity is based on g polymer per g Cr charged (obtained by dividing polymer yield in g by a g Cr), then the values obtained range from about 16 to about 50 kg polymer per g Cr.

Inspection of the polymer properties determined reveals that linear polyethylene having commercial possibilities was prepared based on the melt index, density and flexural modulus values obtained. Broad molecular weight distribution polymer is shown in runs 2-4 based on the high (HLMI)/(MI) values shown. This was confirmed by the high Mw/Mn ratios obtained for the polymers of runs 2, 3. Gel permeation chromatography curves for these polymers, in fact, show a bimodal molecular weight distribution is present.

Densities of the polymers made as well as the vinyl/methyl determinations shown in Table IB indicate that some branches exist along the polymer structure.

EXAMPLE II

Several silica samples modified with bismuth nitrate were prepared by shaking individual 20 g portions of the microspheroidal silica described in Example I with the specified quantity of $Bi(NO_3)_3.5H_2O$ contained in about 20 mL of acetone. The acetone was evaporated and the mixtures calcined as previously described. After The results in Table IIA show that an active catalyst system is produced, especially with a silica: Bi mole ratio of about 6:1 and which is subsequently calcined in air at about 500° C. rather than 700° C. Hydrogen and TEB can be included with the catalyst system to regulate polymer belt index and improve productivity as known in the art. High molecular weight polymer is produced as indicated by the relatively low HLMI values. The high (HLMI)/(MI) values obtained for the polymers of runs 13 and 15 suggest that a bimodal molecular weight distribution is present.

Based on the silica productivity values shown, the silica modified with bismuth appears to be somewhat more active than silica modified with Ca or Mg when used in combination with dicumene chromium in ethylene polymerization. If calculated productivity is based on g polymer per g Cr charged, the values obtained range from about 36 to about 80 kg polymer per gram Cr.

The ESCR value of >1000 hours obtained for the polymer of run 13 indicates that such polymers can be usefully employed in producing pipe, blow molded articles and the like.

EXAMPLE III

Another series of modified silica samples was prepared, generally as before, by admixing 952 grade silica with a reagent selected from among concentrated sulfuric acid, periodic acid ($H_5IO_6$), phenol, malonic acid and ammonium vandate. Each mixture was dried as before, then calcined or used without further calcining, when indicated, in ethylene polymerization with the specified quantity of dicumene chromium and, when used, hydrogen and/or triethylborane as adjuvants.

The silica used in runs 16 and 17 was a control. It was calcined, but not modified with any reagent.

The silica used in runs 18 and 19 was produced by treatment with aqueous $H_2SO_4$ by admixing 20 g of silica, 20 mL of deionized water and 5 mL of concentrated $H_2SO_4$. The mixture was evaporated to apparent dryness, then heated to 300° C. in dry air under fluidizing conditions. A portion of the cooled product was titrated with 0.0087N NaOH solution using a bromocresol green indicator. It was determined that it contained 0.644 mmole $H_2SO_4$/g of calcined composite.

The silica used in run 20 was obtained by reheating a portion of the calcined modified silica used in runs 18 and 19 from about 25° C. to 500° C. in dry air. It was determined by titration that the reheated product contained 0.177 mmole acid/g of calcined composite.

The silica used in run 21 was made from 952 grade silica precalcined in air at 800° C. A 4.5 g portion of the precalcined silica was admixed with 5 mL of concentrated $H_2SO_4$ then heated in dry air to 250° C. Titration showed the product to contain 6.60 mmole acid/g of calcined composite.

The silica used in run 22 was obtained by reheating a portion of the calcined modified silica used in run 21 in dry nitrogen from about 25° C. to 400° C. Titration showed the product to contain 0.225 mmole acid/g of calcined composite.

The silica used in run 23 was prepared by admixing 20 g 952 grade silica, 20 mL of deionized water and 9.0 g of periodic acid, evaporating the mixture of dryness and calcining the product in dry air for 1 hour at 300° C. The dry product, prior to calcining, was calculated to contain about 2 mmoles acid/g. The calcined composite was not analyzed.

The silica used in run 24 was obtained by slurrying 5 g of 952 grade silica, precalcined in dry nitrogen at 800° C., with 0.5 mL (5.6 mmoles) of phenol and n-pentane. The slurry was then evaporated to dryness at about 70° C. in dry nitrogen. It was calculated to contain about 0.9 mmole phenol/g. It was not analyzed.

The silica used in run 25 was obtained by admixing 5.0 g of 952 grade silica, precalcined in dry nitrogen at 700° C., with 0.42 g (4.0 mmoles) of malonic acid and 10 mL of acetonitrile. It was evaporated to dryness at about 120° C. in dry air. It was calculated to contain about 0.8 mmoles malonic acid/g. It was not analyzed.

The silica used in runs 26, 27, 29 and 31 was prepared by admixing 20 g of 952 grade silica, 20 mL of deionized water and 5 g (42.7 mmoles) of ammonium vanadate ($NH_4VO_3$). The mixture was evaporated to dryness and calcined at 500° C. in dry air for 3 hours. The silica was calculated to contain about 9.9 wt % V in the form of an oxide, presumably $V_2O_5$. It was not analyzed.

The silica of run 28 was prepared by calcining a portion of the dry silica/$NH_4VO_3$ composite described above for 3 hours in dry air at 300° C.

The silica of run 30 was prepared by calcining a portion of the dry silica/$NH_4VO_3$ composite described above for 3 hours in dry air at 800° C.

Each catalyst was used in ethylene polymerization as before. The results obtained are set forth in Tables IIIA and IIIB.

TABLE IIIA

Ethylene Polymerization, 96° C. Acid-Treated Silica Support

| Run No. | Acid Used | Final Acidity mmole/g | Activation Temp. °C. | Reactor Adjuvant | Productivity g/g/hr |
|---|---|---|---|---|---|
| 16 | None | 0 | 500 | None | Dead |
| 17 | None | 0 | 500 | TEB | Dead |
| 18 | $H_2SO_4$ | 0.644 | 300 | None | 172[a] |
| 19 | $H_2SO_4$ | 0.644 | 300 | TEB, $H_2$ | 138[b] |
| 20 | $H_2SO_4$ | 0.177 | 500 | None | Dead |
| 21 | $H_2SO_4$ (800)[c] | 6.60 | 250 | None | Dead |
| 22 | $H_2SO_4$ (800)[c] | 0.225 | 400 | None | Dead |
| 23 | $H_5IO_6$ | nd[d] | 300 | None | Dead |
| 24 | Phenol (800)[c] | nd[d] | None | None | Dead |
| 25 | malonic (700)[c] | nd[d] | None | None | Dead |

[a]Calculated value assuming linear catalyst activity. Actual value was 229 g/80 min run time.
[b]Calculated value. Actual value was 207 g/90 min run time.
[c]Temperature employed in precalcining support.
[d]nd is not determined.

The polymer made in invention runs 18 and 19 was evaluated and found to be of commercial quality. The polymer in run 18 produced in the absence of reactor adjuvants was found to have a MI of 0.02 g/10 min, a HLMI of 3.2 g/10 min and a molded density of 0.9518 g/cc. Its terminal vinyl content was 2.3 groups/1000 C atoms and it contained 4.3 methyl groups/1000 C atoms. Flexural modulus and ESCR were not determined.

The polymer of run 19 was produced in the presence of 8 ppm TEB and 0.34 MPa $H_2$, all other conditions being identical to the run 18 polymerization. It was found to have a MI of 0.09 g/10 min, a HLMI of 31 g/10 min, a molded density of 0.9534 g/cc, a flexural modulus of 893 MPa and an ESCR of greater than 1000 hours. Its terminal vinyl content was determined to be about 2.4 groups/1000 C atoms and it contained about 5.6 methyl groups/1000 C atoms.

The somewhat higher MI and HLMI results obtained for the polymer of run 19 prepared in the presence of $H_2$ and TEB compared to that of run 18 in the absence of $H_2$ and TEB indicate that the $H_2SO_4$-treated silica/dicumene chromium catalyst system is moderately responsive to the presence of the adjuvants. The data suggest the instant catalyst system is intermediate in hydrogen response to that of the calcium-treated silica/dicumene chromium catalyst system results shown in Table IB and the bismuth-treated silica/dicumene chromium catalyst system results given in Table IIB. Polymer made with the sulfuric acid-treated silica catalyst system appears to make polymer of higher density than that produced with the calcium, magnesium and bismuth-treated catalyst systems.

The acidity level and/or type of acid employed appears to be critical in the formation of catalytically active systems, however. When weaker acids than $H_2SO_4$ are employed, the negative results in runs 23–25 show that dead catalyst systems result with dicumene chromium. Even with $H_2SO_4$, the level of residual acidity after calcining is shown to be critical in determining when catalytic activity is reached. Thus, the results in Table IIIA show in runs 20, 22 that with a residual acidity about one-third that of the 0.644 mmole/g of invention run 18, a dead catalyst system results. When the acidity level is increased about 10-fold that of run 18 as in run 21, again a dead catalyst system results.

TABLE IIIB

Ethylene Polymerization, 96° C.
Silica-Vanadium Oxide Support

| Run No. | Activation Temp. °C. | Reactor Adjuvant | Productivity g/g/hr | Polymer Properties | | | |
|---|---|---|---|---|---|---|---|
| | | | | MI g/10 min | HLMI g/10 min | Density g/cc | Flex MPa |
| 26 | 500 | None | 160 | 0.03 | 11 | 0.97903 | 1540 |
| 27 | 500 | H$_2$ | 303 | 0.46 | 81 | 0.9667 | 1430 |
| 28 | 300 | TEB | 521 | — | 1.7 | 0.9644 | 1210 |
| 29 | 500 | TEB | 217 | — | 1.6 | 0.9654 | 1250 |
| 30 | 800 | TEB | 16 | — | — | 0.9793 | nd |
| 31 | 500 | TEB | 320 | — | 2.5 | 0.9625 | 1180 |

The results presented in runs 26, 27 of Table IIIB show that the vanadium-treated silica/dicumene chromium catalyst system behaves differently in ethylene polymerization than any of the earlier described catalyst systems. For example, the melt index response to H$_2$ in the reactor is significantly greater as shown by the higher MI and HLMI values. In addition, polymer of significantly higher density is prepared in the absence or presence of H$_2$ and TEB. However, the productivity results given in runs 28-31 indicate that the modified silica should be calcined at relatively low temperatures ranging from about 300° to about 500° C. to maximize catalytic activity, at least with a vanadium concentration of about 10 weight percent. The unusually high polymer densities of about 0.960-0.979 g/cc obtained at a HLMI value of about 2 suggest that a novel type of polyethylene is produced, one perhaps having an unusual molecular weight distribution. Normally, polyethylene of about 2 HLMI produced with a chromium-containing catalyst system exhibits a lower density, e.g. about 0.94-0.95 g/cc.

The examples have been provided merely to illustrate the practice of our invention and should not be read so as to limit the scope of our invention or the appended claims in any way. Reasonable variations and modifications, not departing from the essence and spirit of our invention, are contemplated to be within the scope of patent protection desired and sought.

What is claimed is:

1. A process for (co)polymerizing ethylene which comprises contacting ethylene and 0-10 mole % of at least one mono-1-olefin having 3-10 carbon atoms at a temperature of 20°-300° C. and a pressure ranging from 0 to 1000 psia in the presence of a catalyst consisting essentially of:
    (a) a predominantly silica-containing support treated with in the range of about 0.1-20 mole %, calculated as the metal and based on the untreated support, of at least one compound selected from the group consisting of Group IIA oxide or compounds convertible to the oxide form, a Group VA or VB oxide or compounds convertible to the oxide form or sulfuric acid, and then calcined in an oxygen-containing atmosphere at a temperature in the range of 300°-800° C. for a time in the range of 0.5-20 hours, and thereafter contacted with
    (b) 0.01 to 10 wt. % of at least one zerovalent chromium compound, calculated as chromium metal and based on the weight of the treated support prepared as described in (a).

2. A process in accordance with claim 1 wherein said (co)polymerization is carried out as a particle form polymerization process.

3. A process in accordance with claim 2 wherein there is additionally present 0.1 to 20 parts per million of at least one trihydrocarbylborane having the formula

BR$_3$ wherein R is a hydrocarbyl radical having 1-10 carbon atoms; and wherein the amount of BR$_3$ is based on the weight of diluent employed in the particle form polymerization process.

4. A process in accordance with claim 1 wherein the treated support and the zerovalent chromium compound are contacted in the substantial absence of oxygen and moisture prior to being charged to the polymerization vessel.

5. A process in accordance with claim 1 wherein the treated support and the zerovalent chromium compound are individually charged to the substantially dry, oxygen free polymerization vessel.

6. A process in accordance with claim 1 wherein the polymerization or copolymerization is carried out in the futher presence of hydrogen.

7. A process in accordance with claim 1 wherein said mono-1-olefin is an aliphatic mono-1-olefin having 3-8 carbon atoms.

8. A process in accordance with claim 7 wherein said at least one aliphatic mono-1-olefin is selected from the group consisting of:
    propylene,
    1-butene,
    1-pentene,
    1-hexene,
    3-methyl-1-butene, and
    4-methyl-1-pentene.

9. A process in accordance with claim 3 wherein R is an alkyl group having from 2 up to 5 carbon atoms.

* * * * *